(12) United States Patent
DePenning et al.

(10) Patent No.: US 6,793,197 B2
(45) Date of Patent: Sep. 21, 2004

(54) BUTTERFLY VALVE

(75) Inventors: Charles L. DePenning, Nevada, IA (US); Donald G. Ralston, Conrad, IA (US); Hans D. Baumann, Rye, NH (US)

(73) Assignee: Fisher Controls International, Inc., Marshalltown, IA (US)

( * ) Notice: Subject to any disclaimer, the term of this patent is extended or adjusted under 35 U.S.C. 154(b) by 0 days.

(21) Appl. No.: 10/354,585

(22) Filed: Jan. 30, 2003

(65) Prior Publication Data

US 2004/0149952 A1 Aug. 5, 2004

(51) Int. Cl.⁷ .............................................. F16K 1/226
(52) U.S. Cl. ....................................... 251/305; 123/337
(58) Field of Search .............................. 251/305–308; 123/337

(56) References Cited

U.S. PATENT DOCUMENTS

| | | | |
|---|---|---|---|
| 2,114,168 A | 4/1938 | Auger | 251/11 |
| 3,442,489 A | 5/1969 | Cary et al. | 251/305 |
| 3,677,297 A | 7/1972 | Walton | 137/625 |
| 3,680,833 A | 8/1972 | McNeely, Jr. | 251/305 |
| 3,779,512 A | 12/1973 | Scaramucci | 251/308 |
| 3,809,361 A * | 5/1974 | Pfundstein | 251/305 |
| 3,877,378 A | 4/1975 | Jung | 251/305 |
| 3,945,398 A | 3/1976 | Masheder | 137/527 |
| 3,960,177 A * | 6/1976 | Baumann | 251/305 |
| 4,005,849 A | 2/1977 | Lorthiois | 251/305 |
| 4,037,819 A | 7/1977 | Kindersley | 251/306 |
| 4,083,529 A | 4/1978 | Santy et al. | 251/175 |
| 4,175,578 A | 11/1979 | Priese | 137/67 |
| 4,194,722 A | 3/1980 | Okerblom | 251/305 |
| 4,281,817 A | 8/1981 | Adams et al. | 251/305 |
| 4,296,915 A * | 10/1981 | Baumann | 251/306 |
| 4,327,765 A | 5/1982 | Wilson et al. | 137/312 |
| 4,378,104 A * | 3/1983 | Ben-Ur | 251/306 |
| 4,469,305 A * | 9/1984 | Baumann | 251/305 |
| 4,479,510 A | 10/1984 | Bey | 137/625.31 |
| 4,540,457 A | 9/1985 | LaValley | 156/182 |
| 4,623,121 A | 11/1986 | Donnelly | 251/306 |
| 4,691,894 A | 9/1987 | Pyötsiä et al. | 251/127 |
| 4,712,768 A | 12/1987 | Herr et al. | 251/305 |
| 4,770,393 A | 9/1988 | Hubertson | 251/306 |
| 5,102,097 A | 4/1992 | Davis et al. | 251/283 |
| 5,158,265 A * | 10/1992 | Miyairi | 251/305 |
| 5,160,118 A | 11/1992 | Stary | 251/173 |
| 5,193,572 A | 3/1993 | Le Devehat | 137/244 |
| 5,326,077 A | 7/1994 | Spencer et al. | 251/306 |
| 5,388,806 A * | 2/1995 | Kusmer et al. | 251/306 |
| 5,465,756 A | 11/1995 | Royalty et al. | 137/625.31 |
| 5,685,520 A | 11/1997 | Velan | 251/306 |
| 5,741,006 A | 4/1998 | Murai et al. | 251/305 |
| 5,881,995 A | 3/1999 | Tse et al. | 251/305 |
| 5,934,647 A * | 8/1999 | Marbach | 251/306 |
| 6,029,949 A | 2/2000 | Brown et al. | 251/305 |
| 6,047,950 A | 4/2000 | Pontoppidan et al. | 251/305 |
| 6,079,695 A | 6/2000 | Gasaway et al. | 251/305 |

FOREIGN PATENT DOCUMENTS

| | | |
|---|---|---|
| DE | 85598 | 9/1921 |
| DE | 2359717 | 6/1975 |
| DE | 19846728 A1 | 5/2000 |
| EP | 780608 B1 | 8/2002 |
| FR | 2202245 | 4/1973 |
| JP | 61-278667 | 12/1986 |
| JP | 2-118288 | 5/1990 |
| JP | 4-337167 | 11/1992 |

* cited by examiner

Primary Examiner—Paul J. Hirsch
(74) Attorney, Agent, or Firm—Lahive & Cockfield, LLP

(57) ABSTRACT

A valve having improved inherent flow characteristics and improved dynamic torque characteristics is provided. The valve includes a disk for controlling fluid flow inside the valve. The disk has at least a sealing surface for sealing with a valve seal when the disk is in a closed position. The sealing surface includes a contour and creates a flow clearance with the valve seal as the disk pivots from a closed position toward an open position. A radius of curvature of the contour defines a size of the flow clearance at predetermined disk positions to characterize flow through the valve. The valve can further include an upstream indentation for dynamic torque reduction and/or an indentation for dynamic torque reduction in case of a fluid flow reversal.

31 Claims, 5 Drawing Sheets

28a

28b

28c

28d

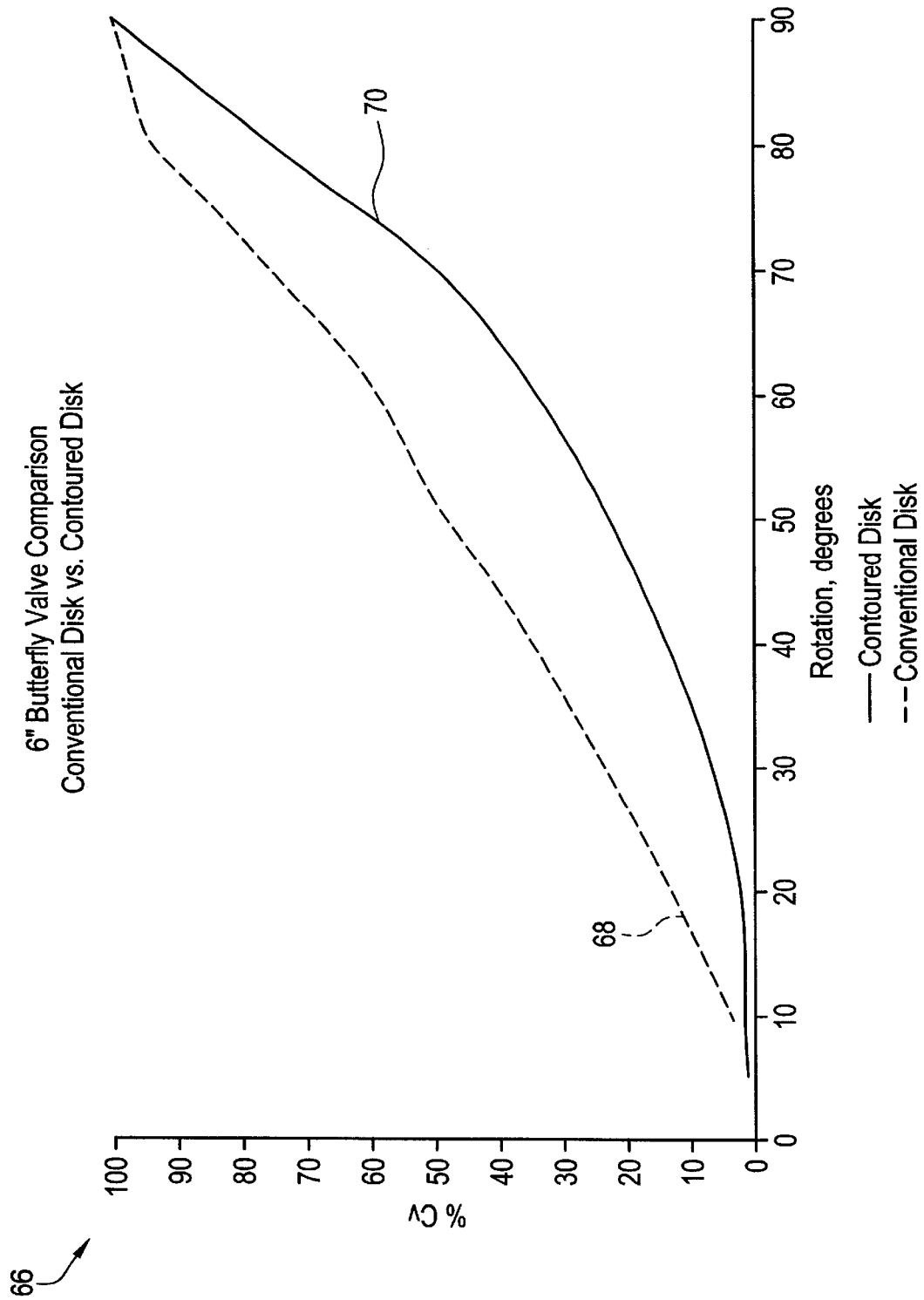

BUTTERFLY VALVE

FIELD OF THE INVENTION

The present invention relates to valves, and more particularly to a butterfly valve having a disk with a shaped edge in predetermined locations on the disk to create flow openings between the disk and a valve wall for defining a flow characteristic of the valve.

BACKGROUND OF THE INVENTION

Conventional butterfly valves operate by positioning a disk within a valve body to control fluid flow through the valve body. The disk rotates about a pivot point or axis defined by a shaft mounted within the valve body. Rotation of the disk, resulting from a torque applied to the shaft, creates or reduces an opening for fluid to flow through the valve body. As the disk is rotated from a closed position (typically vertical) to a fully open position (typically almost horizontal), the flow area through which the fluid can flow increases. The fluid flow can be somewhat controlled by adjusting the angle of rotation of the disk within the valve body. Numerous advances have been made in conventional butterfly valve design to reduce the torque required to operate the valve and to extend the rotational range during operation.

Compared with other types of control valves, for example globe valves, butterfly valves provide a relatively high flow capacity for relatively lower cost. Thus, for specific applications, butterfly valves are very economical. In the alternative, conventional butterfly valves have limited application in process control due to the inherent flow characteristics of these valves. As understood by one of ordinary skill in the art, the butterfly valves are better suited for On-Off flow control applications. Numerous process control applications require precise flow control through the entire operational range of the control valve. When precise flow control is required, rotary ball valves are normally installed, rather than butterfly valves.

Additionally, certain processes require specific or precise inherent or installed flow characteristics. As understood by those skilled in the art, the flow characteristic of a control valve is the ratio between the flow coefficient (Cv) and the travel in degrees of rotation of the disk. This design parameter defines the rate flow through a valve based upon the percent of rate of travel, or the physical position of the control element within the valve body. For example, applications in liquid level control with constant pressure benefit from a linear flow characteristic within the valve.

An additional factor in the application of butterfly valves relates to improving the dynamic torque characteristic of the control valve. As the fluid flows through the valve, a force is applied to the disk by the fluid. In general, as the flow rate increases through the valve, greater force is exerted upon the disk. These increased dynamic forces require more torque to rotate the disk. The amount of torque required to rotate the disk during operation varies depending on type of fluid flowing through the valve, the shape of the disk and the position or orientation of the disk. It is advantageous to lower the torque in a given application. Lower torque requires a smaller actuator to operate the valve, thereby saving physical size and further reducing cost.

Additionally, conventional butterfly valves that operate through 90 degrees of rotation, can experience a torque reversal when the disk rotation approaches 70–80 degrees. At this point of disk rotation, the force exerted upon the disk by the dynamic torque changes from one side of the disk to the opposite side of the disk. Eliminating this reversal potential from the operating characteristics of the butterfly valve results in more stable valve positioning and significantly reduces the possibility for damage to the actuator or valve.

SUMMARY OF THE INVENTION

There is a need in the art for a butterfly valve having improved flow characteristics and improved dynamic torque characteristics. The present invention is directed to further solutions that address this need.

In accordance with one example embodiment of the present invention, a disk for controlling fluid flow inside a valve is provided. The disk includes a sealing surface for sealing with a valve seal when the disk is in a closed position. The sealing surface includes a shaped edge that creates a flow opening with the valve seal as the disk pivots from a closed position toward an open position, such that a profile and location of the shaped edge defines a size of the flow opening at predetermined disk positions to characterize fluid flow therethrough. The shaped edge is an instrument that provides greater opportunity for modifying the flow characteristics. By altering the shape and location of the shaped edge on the disk, the flow characteristics can be modified to create a desired flow characteristic result. The shaped edge further provides for more flow rate control when the disk is partially opened, and also enables a smoother transition between open and closed valve positions.

In accordance with further aspects of the present invention, the disk is disposed offset from a center axis through a pivot point of the disk. An indentation can be provided, formed along the upstream side of the disk for dynamic torque reduction. The indentation includes at least one of a substantially concave curved surface and a ramp surface angled relative to a vertical axis. The disk is suitable for use in a butterfly valve.

In accordance with still further aspects of the present invention, a substantial portion of a planar surface of the disk is angularly offset from a remaining planar surface of the disk to hinder dynamic torque reversal. A cross-sectional thickness of the disk can be relatively smaller at a trailing edge of the disk than a cross-sectional thickness of the disk at a leading edge of the disk.

In accordance with another aspect of the present invention, the shaped-edge is in the form of a curved profile. Alternatively, the shaped edge can include a profile that angles away from the valve seal as the disk rotates about the pivot point to transition from the closed position to the open position. The shaped edge can also be disposed along at least a portion of a downstream side of the disk. The shaped edge can further be disposed proximal to a leading edge of the disk.

In accordance with one embodiment of the present invention, a valve is provided. The valve includes a pivotable disk. The disk includes a sealing surface for sealing with a valve seal when the disk is in a closed position. The sealing surface includes a shaped edge that creates a flow opening with the valve seal as the disk pivots from a closed position toward an open position, such that profile and location of the shaped edge defines a size of the flow opening at predetermined disk positions to characterize fluid flow therethrough.

In accordance with still another aspect of the present invention, a wall of a valve housing is substantially concave to enable the disk to rotate in close proximity to the wall to further characterize fluid flow.

BRIEF DESCRIPTION OF THE DRAWINGS

The aforementioned features and advantages, and other features and aspects of the present invention, will become better understood with regard to the following description and accompanying drawings, wherein:

FIG. 5 is a graph plotting flow area versus degrees of rotation of a valve disk in accordance with one aspect of the present invention.

DETAILED DESCRIPTION

Figure 1:
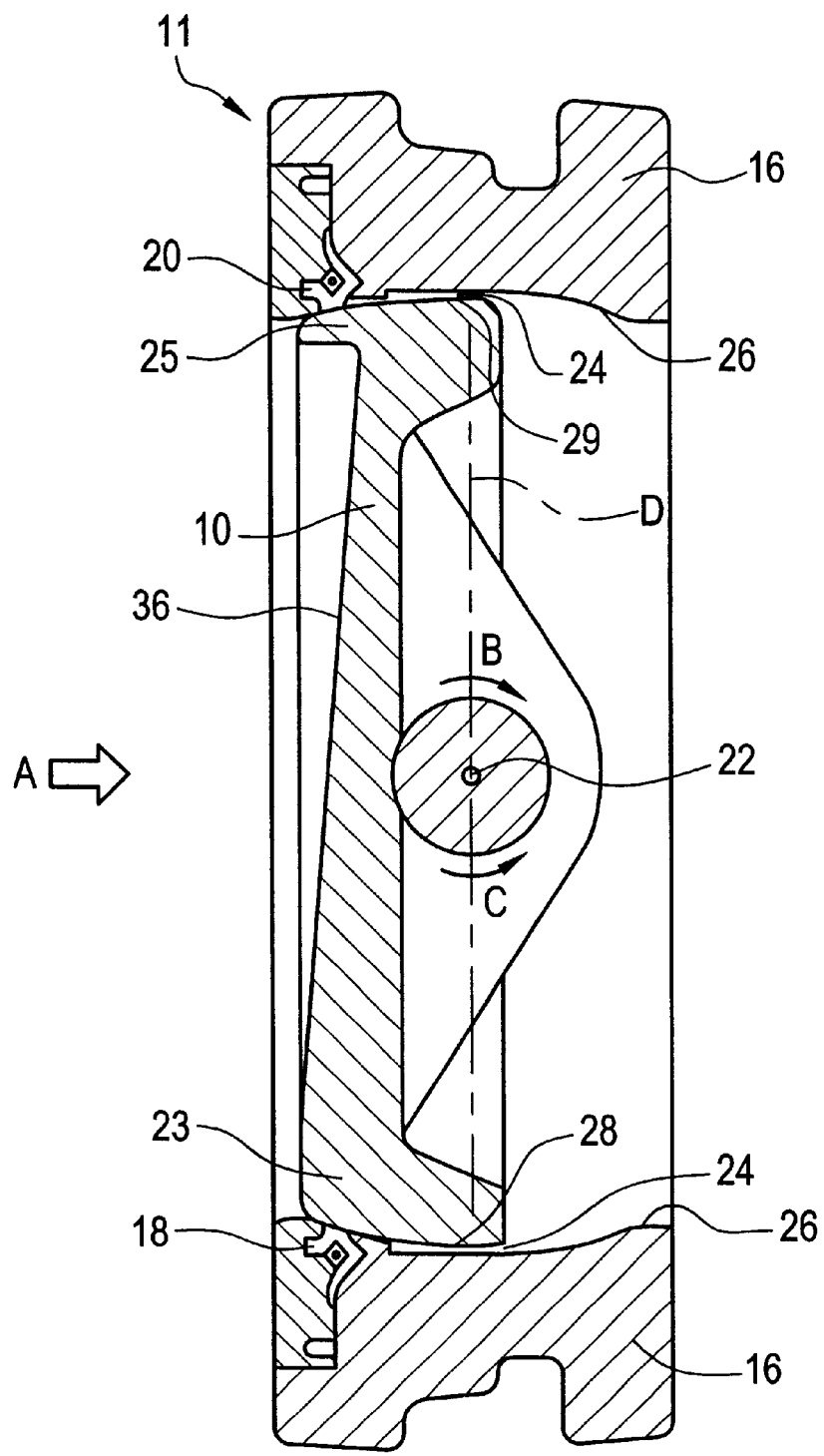
FIG. 1 is a diagrammatic cross-sectional view of a valve according to one aspect of the present invention.

An illustrative embodiment of the present invention relates to a valve containing a flow control disk having a shaped edge, and a predetermined flow opening between the disk and the valve body to control a fluid flow characteristic. The valve housing can additionally have a reduced diametrical section that cooperates with the disk to obtain a desired flow area with the disk, and improve flow control. The resulting valve has a more gradual opening characteristic, which can yield an equal percentage flow characteristic, if desired. An equal percentage flow characteristic, as utilized herein, is characterized by a valve wherein for equal increments of rated travel of the disk, an equal percentage of changes of the flow coefficient (Cv) will result. Alternatively, a linear characteristic or a modified quick opening characteristic can result, in addition to other flow characteristics, with different profile modifications of the shaped edge.

FIGS. 1 through 5, wherein like parts are designated by like reference numerals throughout, illustrate example embodiments of a butterfly valve, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

FIG. 1 is a diagrammatic illustration of one embodiment of a butterfly valve 11 in accordance with the teachings of the present invention. The valve 11 has a housing 16 that forms the valve body. A disk 10 pivotably mounts within the housing 16. The disk 10 mounts on, e.g., a shaft, at a pivot point 22 about which the disk 10 can pivot. As illustrated, fluid flows predominantly in the direction of arrow A. Therefore, the upstream side of the disk 10 is to the left of the disk 10, and the downstream side of the disk 10 is to the right of the disk 10.

The disk 10 serves as an impediment to fluid flow through the valve 11, such that rotation of the disk 10 about the pivot point 22 can increase, decrease, or substantially suspend fluid flow through the valve 11. The disk 10 includes an upper edge 25 and a lower edge 23 as viewed in the illustration of FIG. 1. However, one of ordinary skill in the art will appreciate that the disk 10 is conventionally substantially circular (although can be of non-circular shape), thus maintains a continuous edge around the circumference of the disk 10. The continuous edge is referred to herein as the upper edge 25 and the lower edge 23 merely to aid in the disclosure of certain features of the disk 10 in accordance with the teachings of the present invention.

A seal is disposed within an interior portion of the valve housing 16 having a lower region 18 and an upper region 20 (the seal is a single seal with the lower region 18 and upper region 20 being differentiated here only for clarity in explanation). The disk 10 extends between walls of the valve housing 16, to intersect with the seal lower and upper regions 18 and 20 when the disk is in certain rotational positions. The disk 10 compresses the seal lower and upper regions 18 and 20 to seal the valve 11 closed and substantially hinder fluid flow. The valve 11 is shown in a closed position.

The housing 16, in accordance with the teachings of the present invention, can include a tapering or reducing internal wall surface 26 forming the opening in which the disk 10 operates. The taper or reduction can otherwise be described as a decrease in the interior diameter of the wall surface 26 of the housing 16 in the region around the disk 10. The diameter of the opening is relatively greater in regions of the wall in line with an axis D passing vertically through the pivot point 22, as illustrated. Generally, the diameter decreases on either side of the vertical axis moving along the wall surface 26 away from the vertical axis D. The diameter dimension, as it decreases traveling away from the vertical axis D, creates a substantially curved wall surface 26. The curved wall surface 26 which contributes to the ability of the disk 10 to characterize flow in accordance with the teachings of the present invention and as further discussed later herein. One of ordinary skill in the art will additionally appreciate that the wall surface 26 does not need to be curved as illustrated, but can be straight, or of a number of other contours. Further, the upper wall surface 26 proximal to the upper edge 25 of the disk 10 can maintain a curve or other profile, while the lower wall surface 26, proximal to the lower edge 23 of the disk 10, can be of another profile. Different wall surface 26 configurations can lead to different flow characterizations as the wall surface 26 works in conjunction with the disk 10 to control fluid flow through the valve 11.

The seal lower and upper regions 18 and 20 are disposed at or near approximately the smallest wall surface 26 diameter on one side of the disk 10. The location of the seal lower and upper regions 18 and 20 at or near approximately the smallest wall surface 26 diameter enables the disk 10 to substantially shut off fluid flow through the valve 11. The disk 10 is offset from the vertical axis D passing through the pivot point 22. Therefore, the smallest wall surface 26 diameter occurs on the upstream side of the vertical axis D in the illustrative figures due to the offset of the upper edge 25 and the lower edge 23 of the disk 10 relative to the pivot point 22. If the upper edge 25 and the lower edge 23 of the disk 10 are in line with the vertical axis D, the seal lower and upper regions 18 and 20 are then located in line with the vertical axis D as well. Such an arrangement shifts the smallest wall surface 26 diameter to approximately coincide with the vertical axis D passing through the pivot point 22. One of ordinary skill will therefore appreciate that the smallest wall surface 26 diameter and the location of the seal lower and upper regions 18 and 20 can vary with the specific configuration of the disk 10.

As previously mentioned, fluid flows predominantly in the direction of arrow A. Therefore, the disk 10 rotates in the direction of arrow B to open, and in the direction of arrow C to close. One of ordinary skill in the art will appreciate that the direction of fluid flow through the valve 11, and the orientation of the disk 10 within the valve 11, can vary. Although the primary direction of flow is in the direction of arrow A, in some instances butterfly valves structured in accordance with the teachings of the present invention can experience a reverse flow condition. During reverse flow, the fluid flows in a direction opposite to that of arrow A. In such circumstances, the disk 10 can include one or more features to characterize and control the fluid flow in the direction of arrow A, as well as, in the reverse direction.

As the disk 10 rotates about the pivot point 22, the upper edge 25 and the lower edge 23 follow along the reduced diametrical section 26 of the valve housing 16. The lower edge 23 is also the leading edge of the disk 10 into the predominant fluid flow. The upper edge 25 is therefore the trailing edge in the fluid flow.

The disk 10 includes a ramped cavity 36 extending along an upstream side of the disk 10. The ramped cavity 36 serves to provide dynamic torque reduction. The ramp provides added fluid pressure on the upper edge 25 of the disk 10 as the disk rotates from a closed position to an open position. The added pressure reduces the amount of torque required to rotate the disk from the closed position to an open position.

A flow opening 24 exists between the upper edge 25 and the lower edge 23 of the disk 10, and the wall surface 26 of the valve housing 16. The reduced diametrical section of the wall surface 26 allows the disk 10 to pass along the valve housing 16 during rotation without significantly increasing the area of the flow opening 24. The flow opening 24 is formed by a shaped edge 28 disposed along the disk 10. The shaped edge 28 has a predetermined profile, which can itself vary along the shaped edge 28. The flow opening 24 increases gradually as the disk 10 pivots and the lower edge 23 passes over the seal lower region 18 and extends into the oncoming flow.

Figure 2A:
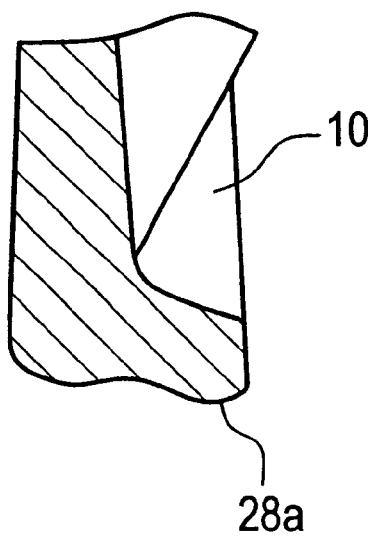
FIGS. 2A, 2B, 2C, and 2D are diagrammatic cross-sectional views of a shaped edge of a valve disk in accordance with further aspects of the present invention.

The change in the size of the flow opening 24 allows manipulation of the flow characteristic through the valve 11. In other words, the flow opening 24 can be varied as the disk 10 pivots to open the valve 11, such that the flow characteristic can be manipulated to be linear, equal percentage, or have other desired characteristics as will be discussed later herein. One of ordinary skill in the art will appreciate that the shaped edge 28 can have many different forms with different surface features. FIGS. 2A through 2D illustrate a number of example shaped edge 28 embodiments for varying the flow characteristic of the fluid flow through the valve. FIG. 2A shows an embodiment having a shaped edge 28a with a slight indentation. This configuration generates a flow hindering blockage on front side and back side of the disk 10 (either end of the shaped edge 28a), with a brief increase in the flow opening during a middle interval in which the shaped edge 28a pulls away from the sealing surface.

Figure 2B:
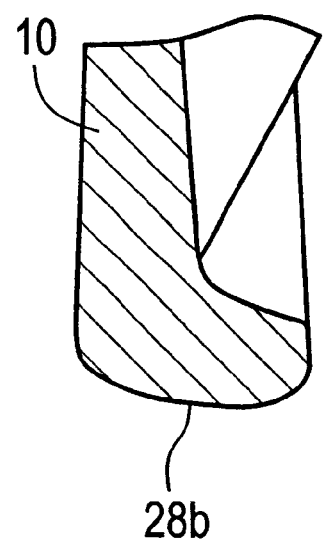

FIG. 2B illustrates another embodiment of a shaped edge 28b. The shaped edge 28b maintains a substantially similar profile to the shaped edge 28 of FIG. 1. However, there is a dramatic decrease in the radius of curvature of the shaped edge 28b toward the right side of the shaped edge 28b (i.e., the backside of the disk 10) as shown. This dramatic decrease in the radius of curvature causes a dramatic increase in the flow opening 24 when that portion of the shaped edge 28b passes over the seal. The increase in the size of the flow opening 24 remains less than that which occurs in conventional butterfly valves having a corner rather than a curve in a similar location on the disk. Therefore, the increase in the flow opening 24 and the subsequent flow rate remains less than the increase in flow rate at the back edge of a conventional butterfly disk.

Figure 2C:
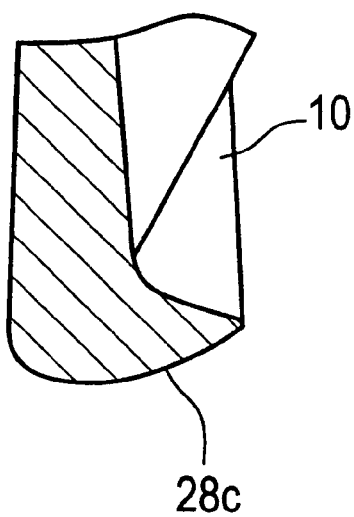

FIG. 2C illustrates another example embodiment of a shaped edge 28c in accordance with the teachings of the present invention. The shaped edge 28c maintains a curved profile that angles up and away from the seal lower region 18 as the disk passes over the seal. The increased angle relative to horizontal causes the flow opening 24 to increase relatively more rapidly than with the shaped edge 28b of FIG. 2B, for an equal degree of rotation of the disk. However, the increase in the flow opening 24 occurs in a more controlled manner than with a more abrupt corner as with a conventional butterfly disk. With the illustrative configuration of the shaped edge 28c the increase in flow opening 24, and thus the increase in flow rate, is greater than with an equal percentage valve.

Figure 2D:
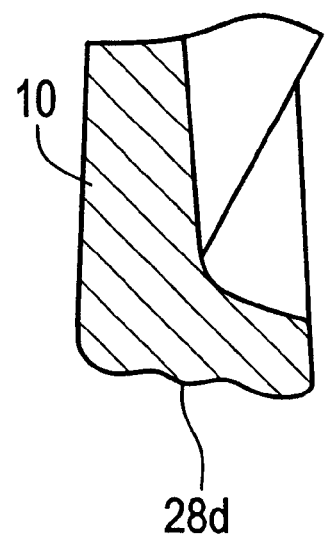

FIG. 2D illustrates another embodiment of a shaped edge 28d. As shown, the shaped edge 28d alternates between a concave and a convex profile. With this configuration, as the disk rotates from a closed position to an open position, the flow opening 24 alternates between increasing and decreasing in size. This alteration of opening size creates an alternating fluid flow that increases and decreases in rate as the disk passes over the seal lower region 18.

The applications for each of the aforementioned embodiments can vary and are understood by those of ordinary skill in the art. FIGS. 2A through 2D are provided to show examples of the wide variety of shaped edges that are available in accordance with the teachings of the present invention for modifying the flow characteristic of fluid flow through a valve. As shown, the modification of the profile of the shaped edge can vary the size of the flow opening in different ways, effecting a different control over the fluid flow through the flow opening. Therefore, in accordance with the teachings of the present invention, the flow characteristic of a valve can be determined by different shaped edge profiles.

Figure 3A:
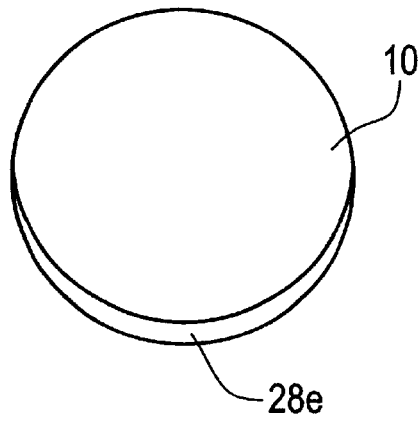
FIGS. 3A, 3B, and 3C are diagrammatic rear views of a valve disk in accordance with still other aspects of the present invention.
Figure 3B:
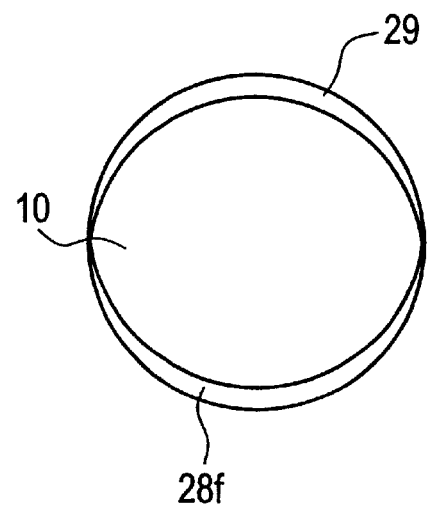
Figure 3C:
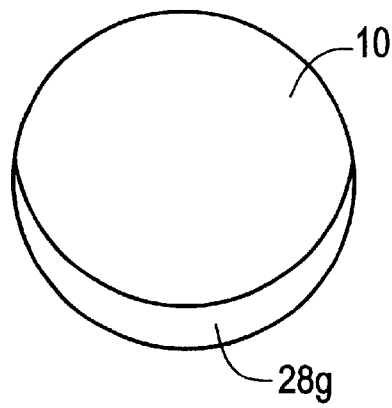

In addition to having a different profile for different flow characteristics, the shaped edge 28 can also be disposed in different locations around the disk 10. FIGS. 3A through 3C illustrate several embodiments in accordance with the teachings of the present invention. The figures show the disk 10 in different configurations as viewed from downstream of the disk, looking at the backside of the disk 10. A shaped edge 28e is shown in FIG. 3A in a similar configuration to a shaped edge 48 in FIG. 4. The shaped edge 28e is disposed along the lower edge 23 of the disk 10 and can characterize flow in accordance with the teachings of the present invention. As the lower edge 23 passes over a seal (e.g., the seal lower region 18), the shaped edge 28e provides a predetermined characterization of the flow as the valve transitions from fully closed to fully open position.

FIG. 3B shows a shaped edge 28f disposed across the lower edge 23 of the disk 10, with a second shaped edge 29 disposed across the upper edge 25 of the disk 10. The shaped edge 28f performs a similar function to the shaped edge 28e of FIG. 3A, while the second shaped edge 29 provides further characterization of the fluid flow. As the fluid flows over the trailing edge of the disk 10 at the upper edge 25, the second shaped edge 29 can effect influence on the fluid flowing over the upper edge 25. The second shaped edge 29 therefore works in conjunction with the shaped edge 28f on the lower edge 23 to characterize the flow in a desired manner.

FIG. 3C shows another embodiment of a shaped edge 28g. The shaped edge 28g of this embodiment is relatively larger than that of the previous figures. The larger shaped edge 28g can provide a greater influence on the fluid flow, to achieve a desired fluid characterization. In addition, the larger surface can provide more space for modifying the flow as desired.

Thus, it can be seen that the shape of the shaped edge can be modified in both cross-sectional profile, and planar location on the disk to effect different characterizations of fluid flow through the valve. The applications for each of the aforementioned embodiments can vary and are understood by those of ordinary skill in the art. FIGS. 3A through 3C show examples of shaped edges available in accordance with the teachings of the present invention for modifying the flow characteristic of fluid flow through a valve. As shown, the modification of the location of the shaped edge on the disk can effect a different control over the fluid flow through the flow opening. Therefore, in accordance with the teachings of the present invention, the flow characteristic of a valve can be further determined by different shaped edge locations.

A surface profile of the reduced diametrical section of the wall surface 26 likewise influences the size of the flow opening 24 as the disk 10 rotates about the pivot point 22. As the disk 10 rotates, the wall surface 26 tapers away from the disk 10, thus causing the flow opening 24 to increase and allow more fluid flow (i.e., less fluid flow impedance). One of ordinary skill in the art will appreciate that the shape of the wall surface 26 can vary depending on desired flow characteristics.

More specifically, in the illustrative embodiment the shaped edge 28 has substantially a curved profile. As the disk 10 passes over the seal lower region 18, the curvature of the shaped edge 28 gradually increases the size of the flow opening 24 because the curve gradually moves away from the seal lower region 18 with the movement of the disk 10. In other words, a radius of curvature of the curve forming the shaped edge 28 gradually decreases. The decrease causes the curve to pull or taper away from the intersection of the lower edge 23 and the seal lower region 18 as the disk 10 pivots and moves the lower edge 23 past the seal lower region 18.

The increase of the flow opening 24 is proportional to the pivotal position of the disk 10. The curvature of the shaped edge 28 provides a flow characteristic that substantially differs from a conventional butterfly valve. In a conventional valve without the curvature of the shaped edge 28, the increase in flow is more abrupt as the disk pivots and the lower edge of the disk passes over the seal. The curvature of the shaped edge 28 in the present invention creates a more gradual increase in the flow opening 24, resulting in a more gradual increase in the flow rate as the valve opens. It should be noted that the flow opening 24 can differ between the upper edge 25 and the lower edge 23 of the disk 10.

Figure 4:
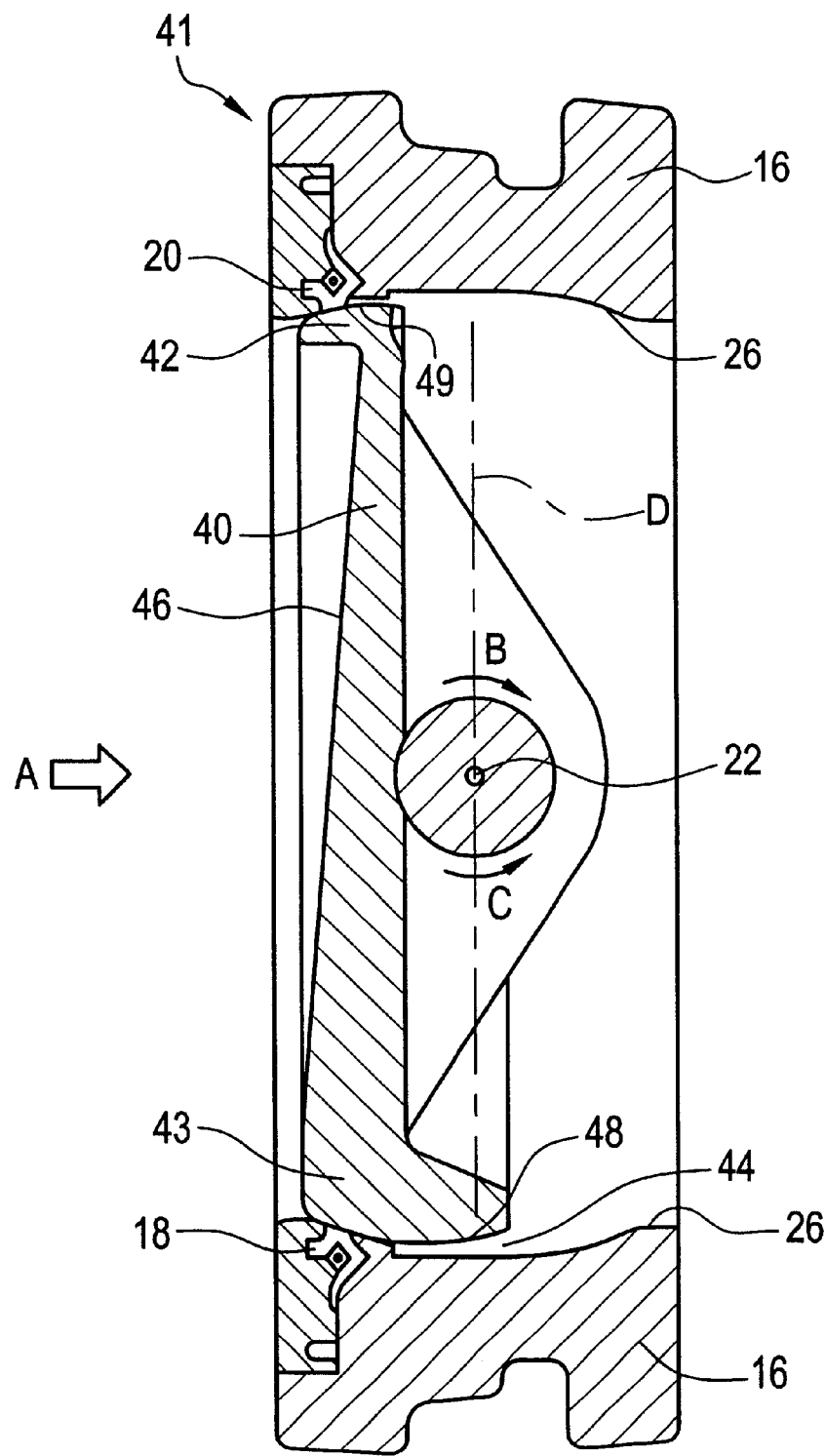
FIG. 4 is a diagrammatic cross-section of a valve in accordance with yet another aspect of the present invention.

FIG. 4 is a diagrammatic illustration of another embodiment of a butterfly valve 41 in accordance with the teachings of the present invention. The valve 41 has a housing 16 that forms the valve body. A disk 40 pivotably mounts within the housing 16. The disk 40 mounts on, e.g., a shaft, at the pivot point 22 about which the disk 40 can pivot. As illustrated, fluid again flows predominantly in the direction of arrow A. Therefore, the upstream side of the disk 40 is to the left of the disk 40, and the downstream side of the disk 40 is to the right of the disk 40, as illustrated.

Rotation of the disk 40 about the pivot point 22 can increase, decrease, or substantially suspend fluid flow through the valve 41. The disk 40 includes an upper edge 42 and a lower edge 43 as viewed in the illustration of FIG. 4.

The seal lower and upper regions 18 and 20 remain disposed within an interior portion of the valve housing 16. The disk 40 extends between walls of the valve housing 16, to intersect with the seal lower and upper regions 18 and 20 when the disk is in certain rotational positions. The disk 40 compresses the seal lower and upper regions 18 and 20 to seal the valve 41 closed. The disk 40, as with disk 10, serves as an impediment to fluid flow through the valve 41. Thus, rotation of the disk 40 can increase, decrease, or substantially suspend fluid flow through the valve 11. The valve 41 is shown in a closed position.

The housing 16, in accordance with the teachings of the present invention, can further include the internal wall surface 26, having a decrease in the interior diameter, and forming the opening in which the disk 40 operates. The diameter of the opening is relatively greater in regions of the wall in line with the vertical axis D passing through the pivot point 22, as illustrated. The diameter decreases on either side of the vertical axis D moving along the wall surface 26 away from the vertical axis D. The diameter dimension, as it decreases traveling away from the vertical axis D, creates the substantially curved wall surface 26. The curved wall surface 26 contributes to the ability of the disk 40 to characterize flow in accordance with the teachings of the present invention and as further discussed later herein. One of ordinary skill in the art will additionally appreciate different wall surface 26 configurations can lead to different flow characterizations as the wall surface 26 works in conjunction with the disk 40 to control fluid flow through the valve 41.

The seal lower and upper regions 18 and 20 are disposed at or near approximately the smallest wall surface 26 diameter on one side of the disk 40. The location of the seals at or near approximately the smallest wall surface 26 diameter enables the disk 40 to substantially shut off fluid flow through the valve 41. The disk 40 is offset from the vertical axis D passing through the pivot point 22. One of ordinary skill will appreciate that the smallest wall surface 26 diameter and the location of the seal lower and upper regions 18 and 20 can vary with the specific configuration of the disk 40.

As previously mentioned, fluid flows predominantly in the direction of arrow A. Therefore, the disk 10 rotates in the direction of arrow B to open, and in the direction of arrow C to close. One of ordinary skill in the art will appreciate that the direction of fluid flow through the valve 41, and the orientation of the disk 40 within the valve 41, can vary.

As the disk 40 rotates about the pivot point 22, the upper edge 43 and the lower edge 43 follow along the reduced diametrical section 26 of the valve housing 16. The lower edge 43 is also the leading edge of the disk 40 into the predominant fluid flow. The upper edge 42 is therefore the trailing edge in the fluid flow.

The disk 40 includes the ramped cavity 36 extending along an upstream side of the disk 40. The ramped cavity 36 serves to provide dynamic torque reduction as previously described.

A flow opening 44 exists between the upper edge 42 and the lower edge 43 of the disk 40, and the wall surface 26 of the valve housing 16. The reduced diametrical section of the wall surface 26 allows the disk 40 to pass along the valve housing 16 during rotation without significantly increasing the area of the flow opening 44. The flow opening 44 is formed by a shaped edge 48 disposed along the disk 40. The shaped edge 48 has a predetermined profile, which can itself vary along the shaped edge 48. The flow opening 44 increases gradually as the disk 40 pivots and the lower edge 43 passes over the seal lower region 18 and extends into the oncoming flow.

The change in the size of the flow opening 44 allows manipulation of the flow characteristic through the valve 41. As demonstrated above, the shaped edge 48 can take many different forms, and be disposed in many different locations along the disk 40. Each variation in profile and location can effect a change in the flow characteristic of the valve.

The cross-sectional area of the upper edge 42 in FIG. 4 is less than the cross-sectional area of the upper edge 25 in FIG. 1. It was found that the smaller cross-sectional area of the upper edge 42 results in the disk 40 taking up less fluid flow area. With the disk 40 taking up less of the fluid flow area, there is less impedance to fluid flow when the disk 40 is rotated into an open position. Less impedance to fluid flow results in improved flow rate when the valve is open.

Again, the change in the size of the flow opening 44 allows manipulation of the flow characteristic through the valve. More specifically, the ability to alter the shaped edge 28 and 48 to vary the size of the flow opening 44 at different valve positions provides greater flexibility in possible applications of a butterfly valve. The contour can be provided either on the portion of the disk 10 and 40 that extends into the oncoming flow, on the other portions of the disk 10 and 40, or on the entire disk 10 and 40. If a linear opening characteristic is desired, a specific profile can be machined on the contoured area, and the location of the contour area can be adjusted, to achieve the linear characteristic. Likewise, a linear characteristic, equal percentage characteristic, or a modified quick opening characteristic, can be created to meet specific requirements of a particular valve application. This ability to modify the flow opening 44, and thus, the flow characteristic, can enable a butterfly valve to be used in a control system as a precision control element.

FIG. 5 is a graph 66 illustrating the relationship between the flow area and the degrees of rotation of a disk within a valve as fluid flows therethrough. Two sets of data are plotted on the graph 66. A first set represents the flow characteristics of fluid flowing through a valve having a conventional single vane as depicted in a first flow line 68. The second set of data represents flow characteristics of fluid flow through a valve having a disk with a shaped edge in a second flow line 70 in accordance with the teachings of the present invention.

Between the degrees of rotation of zero and five, both arrangements of disks appear to operate relatively similarly with respect to the amount of flow area exposed. Between the degrees of rotation of ten and approximately twenty, the valve having a conventional disk experiences an increase in flow area of about 1.6 square inches or 7.3%. The valve having a disk with a shaped edge experiences zero to a minimal amount of flow area increase of about 0.4 square inches or 1.89%. First flow line 68 continues for the valve having a conventional disk with a rapid increase in flow area relative to degrees of rotation between twenty and ninety. Second flow line 70 continues with a more gradual increase of flow area as the degrees of rotation increase between twenty and forty-five. At the maximum degrees of rotation of 90 degrees, the conventional butterfly valve has approximately 22 square inches of flow area available for fluid flow, while the valve having a shaped edge disk has approximately 21.2 square inches of flow area available for fluid flow. With the gradual opening near the seating position (i.e., the lower degrees of rotation) there is less of a need for flow control close to the point of valve shutoff. The range between zero and ten degrees of rotation in the valve having a disk with a shaped edge, a range where there are often valve shutting and hammering issues, does not experience such issues for the configuration in accordance with the teachings of the present invention. The shaped edge structure does reduce the overall flow area for the valve, versus the conventional disk structure. However, the overall size and dimensions of the valve can be increased if a greater flow area is desired.

In operation, as the disk 10 and 40 rotates about the pivot point 22, the edge of the disk 10 and 40 passes beyond the seal lower region 18 to open the valve for some minimal fluid flow. The fluid flow is minimal because the fluid can slowly escape through the flow opening 24 and 44. A larger volume of fluid flow does not occur until the disk 10 and 40 rotates in the direction of arrow B in an amount sufficient for the shaped edge 28 and 48 to pass over the seal lower region 18. The slow and gradual increase of the fluid flow improves the inherent flow characteristics of the valve containing the disks 10 and 40 of the present invention.

To close the valve, the disk 10 and 40 rotates in the direction of arrow C. The edge of the disk 10 and 40 reaches the seal lower region 18 and passes over the seal lower region 18. As the disk 10 and 40 passes over the seal lower region 18, the fluid flow impedes, but still flows through the flow opening 24 and 44. Additional rotation of the disk 10 and 40 brings additional portions of the shaped edge 28 and 48 to pass over the seal lower region 18 and the seal upper region 20 to gradually reduce fluid flow, and eventually shut off the valve 11 or 41. The gradual reduction of fluid flow improves the flow characteristics.

As the disk 10 and 40 passes over the seal lower region 18, the disk concomitantly passes over the seal upper region 20. The disk 10 and 40 rotates about the pivot point 22 in the direction of arrow B, and the upper edge 25 and 42 pulls away from the seal upper region 20 to create a fluid flow path. The upper edge 25 and 42 can likewise work in conjunction with the wall surface 26 to further characterize flow through the valve 11 and 41.

The present invention features a valve, illustrated in the form of a butterfly valve, having a rotating disk modified to include a shaped edge in addition to other characteristics. The disk can further include indentations at an upstream or downstream side to improve dynamic torque characteristics of the valves. In addition, there can be multiple shaped edges, and each shaped edge can have alternative shapes to characterize flow through the valves. Further, the gradual opening characteristics near the seating position can provide for an equal percentage flow characteristic valve. Alternatively, a linear characteristic or a modified quick opening characteristic, among other characteristics, are possible with use of the shaped edge in accordance with the teachings of the present invention.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A disk for characterizing fluid flow inside a valve, the disk comprising:
   a sealing surface for sealing with a valve seal when the disk is in a closed position, the sealing surface including an upstream portion and a downstream portion;
   wherein the upstream portion and the downstream portion include shaped edges that create a flow opening between the sealing surface and the valve seal as the disk pivots from a closed position toward an open position, such that a profile and location of the shaped edge defines a size of the flow opening at predetermined disk positions to characterize fluid flow in a predetermined manner.

2. The disk according to claim 1, wherein the disk is disposed offset from a center axis through a pivot point of the disk.

3. The disk according to claim 1, further comprising an indentation formed along the upstream side of the disk for dynamic torque reduction.

4. The disk according to claim 3, wherein the indentation comprises at least one of a substantially concave curved surface and a ramp surface angled relative to a vertical axis.

5. The disk according to claim 1, wherein the disk is suitable for use in a butterfly valve.

6. The disk according to claim 1, wherein a substantial portion of a planar surface of the disk is angularly offset from a remaining planar surface of the disk to hinder dynamic torque reversal.

7. The disk according to claim 1, wherein a cross-sectional thickness of the disk is relatively smaller at the downstream portion of the disk than a cross-sectional thickness of the disk at the upstream portion of the disk.

8. The disk according to claim 1, wherein the shaped edge comprises a curved profile.

9. The disk according to claim 1, wherein the shaped edge comprises a profile that angles away from the valve seal as the disk rotates about the pivot point to transition from the closed position to the open position.

10. A valve, comprising:
    a valve body, the valve body having a substantially concave downstream cross section;
    pivotable disk disposed within the valve body for characterizing flow through the valve, the pivotable disk having at an upstream portion and a downstream portion providing a sealing surface for sealing with a valve seal when the disk is in a closed position;
    wherein at least one of the upstream portion and the downstream portion includes a shaped edge that creates a flow opening between the sealing surface and the valve seal as the disk pivots from a closed position toward an open position such that at least one of the upstream portion and the downstream portion cooperates with the downstream cross section of the valve body to characterize fluid flow therethrough.

11. The valve according to claim 10, wherein the valve is a butterfly valve.

12. The valve according to claim 10, wherein the disk is disposed offset from a center axis through a pivot point of the disk.

13. The valve according to claim 10, further comprising an indentation formed along the upstream side of the disk for dynamic torque reduction.

14. The valve according to claim 13, wherein the indentation comprises at least one of a substantially concave curved surface and a ramp surface angled relative to a vertical axis.

15. The valve according to claim 10, wherein the disk is suitable for use in a butterfly valve.

16. The valve according to claim 10, wherein a substantial portion of a planar surface of the disk is angularly offset from a remaining planar surface of the disk to hinder dynamic torque reversal.

17. The valve according to claim 10, wherein a cross-sectional thickness of the disk is relatively smaller at the upstream portion of the disk than a cross-sectional thickness of the disk at the downstream portion of the disk.

18. The valve according to claim 10, wherein the shaped edge comprises a curved profile.

19. The valve according to claim 10, wherein the shaped edge comprises a profile that angles away from the valve seal as the disk rotates about the pivot point to transition from the closed position to the open position.

20. A disk for characterizing fluid flow inside a valve, the disk comprising:
    a sealing surface for sealing with a valve seal when the disk is in a closed position, the disk further having a cross-sectional thickness relatively smaller at a trailing edge of the disk than a cross-sectional thickness of the disk at a leading edge of the disk;
    wherein the sealing surface includes a shaped edge that creates a flow opening between the sealing surface and the valve seal as the disk pivots from a closed position toward an open position, such that a profile and location of the shaped edge defines a size of the flow opening at predetermined disk positions to characterize fluid flow therethrough.

21. The disk according to claim 20, wherein the disk is disposed offset from a center axis through a pivot point of the disk.

22. The disk according to claim 20, further comprising an indentation formed along the upstream side of the disk for dynamic torque reduction.

23. The disk according to claim 22, wherein the indentation comprises at least one of a substantially concave curved surface and a ramp surface angled relative to a vertical axis.

24. The disk according to claim 20, wherein a substantial portion of a planar surface of the disk is angularly offset from a remaining planar surface of the disk to hinder dynamic torque reversal.

25. The disk according to claim 20, wherein the shaped edge comprises a curved profile.

26. A valve, comprising:
    a valve body;
    a pivotable disk disposed within the valve body for characterizing flow through the valve, the pivotable disk having a cross-sectional thickness relatively smaller at a trailing edge of the disk than a cross-sectional thickness of the disk at a leading edge of the disk; and
    a sealing surface for sealing with a valve seal when the disk is in a closed position;
    wherein the sealing surface includes a shaped edge that creates a flow opening between the sealing surface and the valve seal as the disk pivots from a closed position toward an open position, such that a profile and location of the shaped edge defines a size of the flow opening at predetermined disk positions to characterize fluid flow therethrough.

27. The valve according to claim 25, wherein the disk is disposed offset from a center axis through a pivot point of the disk.

28. The valve according to claim 25, further comprising an indentation formed along the upstream side of the disk for dynamic torque reduction.

29. The valve according to claim 28, wherein the indentation comprises at least one of a substantially concave curved surface and a ramp surface angled relative to a vertical axis.

30. The valve according to claim 25, wherein a substantial portion of a planar surface of the disk is angularly offset from a remaining planar surface of the disk to hinder dynamic torque reversal.

31. The valve according to claim 25, wherein the shaped edge comprises a curved profile.

* * * * *

UNITED STATES PATENT AND TRADEMARK OFFICE
CERTIFICATE OF CORRECTION

PATENT NO. : 6,793,197 B2
DATED : September 21, 2004
INVENTOR(S) : Charles L. DePenning et al.

It is certified that error appears in the above-identified patent and that said Letters Patent is hereby corrected as shown below:

Column 1,
Line 48, please delete "shaped-edge" and insert -- shaped edge --.

Column 11,
Line 44, please delete "pivotable" and insert -- a pivotable --.

Signed and Sealed this

Fifteenth Day of March, 2005

JON W. DUDAS
*Director of the United States Patent and Trademark Office*